(12) United States Patent
Hjerto et al.

(10) Patent No.: US 10,114,407 B2
(45) Date of Patent: Oct. 30, 2018

(54) DATA TRANSFER BETWEEN CLOCK DOMAINS

(71) Applicant: NORDIC SEMICONDUCTOR ASA, Trondheim (NO)

(72) Inventors: Markus Bakka Hjerto, Oslo (NO); Arne Wanvik Venas, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 65 days.

(21) Appl. No.: 14/410,655

(22) PCT Filed: Jun. 20, 2013

(86) PCT No.: PCT/GB2013/051607
§ 371 (c)(1),
(2) Date: Dec. 23, 2014

(87) PCT Pub. No.: WO2014/001764
PCT Pub. Date: Jan. 3, 2014

(65) Prior Publication Data
US 2015/0177776 A1    Jun. 25, 2015

(30) Foreign Application Priority Data

Jun. 27, 2012   (GB) .................................. 1211426.0

(51) Int. Cl.
*G06F 1/12*    (2006.01)
*G06F 5/06*    (2006.01)
*G06F 1/10*    (2006.01)

(52) U.S. Cl.
CPC .................. *G06F 1/12* (2013.01); *G06F 1/10* (2013.01); *G06F 5/06* (2013.01)

(58) Field of Classification Search
CPC ....................................................... G06F 1/12
(Continued)

(56) References Cited

U.S. PATENT DOCUMENTS 5,987,081 A    11/1999   Cxoppenszky et al.
6,425,088 B1    7/2002   Yasukawa et al.
(Continued)

FOREIGN PATENT DOCUMENTS

JP    H11161599 A    6/1999
JP    2008258861 A    10/2008
(Continued)

OTHER PUBLICATIONS

International Preliminary Report on Patentability from corresponding Appl. No. PCTGB2013/051607, dated Jan. 8, 2015.
(Continued)

*Primary Examiner* — Jaweed A Abbaszadeh
*Assistant Examiner* — Sumil Desai
(74) *Attorney, Agent, or Firm* — Koppel, Patrick, Heybl & Philpott (57) ABSTRACT

A system (1) for transferring a data signal (sig_fast) from a first clock domain (4) to a second clock domain (8). The first clock domain (4) has a first clock (ck_fast) with a frequency greater than the frequency of a second clock (ck_slow) in the second clock domain (8). The system (1) also has a signal input (10) for receiving an input signal (sig_fast) from the first clock domain (4), means (16, 18) for checking whether the second clock (ck_slow) is in a part of its cycle away from a forthcoming transition, and means (22) for transferring the input signal (sig_fast) to the second clock domain (8) if the checking means (16, 18) determines that the second clock (ck_slow) is in part of its cycle away from a forthcoming transition. The checking means (16, 18) are clocked by the first clock (ck_fast).

30 Claims, 4 Drawing Sheets

(58) Field of Classification Search
USPC ........................................................ 713/400
See application file for complete search history.

(56) References Cited

U.S. PATENT DOCUMENTS

| | | | | |
|---|---|---|---|---|
| 6,549,593 | B1* | 4/2003 | Rumreich | G06F 5/06 |
| | | | | 375/354 |
| 7,562,244 | B2 | 7/2009 | Wielage | |
| 2003/0056137 | A1 | 3/2003 | Huelskamp | |
| 2003/0123588 | A1* | 7/2003 | Parikh | G06F 5/06 |
| | | | | 375/354 |
| 2005/0110524 | A1* | 5/2005 | Glasser | H03K 5/135 |
| | | | | 326/96 |
| 2007/0288786 | A1* | 12/2007 | Miller | G06F 1/10 |
| | | | | 713/500 |
| 2009/0225915 | A1* | 9/2009 | Hassan | H04L 7/0012 |
| | | | | 375/354 |

FOREIGN PATENT DOCUMENTS

| | | |
|---|---|---|
| TW | 201133248 | 10/2011 |
| TW | 201205232 | 2/2012 |
| WO | 2008/129364 | 10/2008 |

OTHER PUBLICATIONS

Form PCT/ISA/220 notification of transmittal of the international search report and written opinion of the international searching authority dated Dec. 11, 2012, Form PCT/ISA/210 International Search Report, PCT/ISA/237 Written Opinion of the International Searching Authority for PCT/GB2013/051607.
UK Search Report for GB1211426.0 dated Dec. 11, 2012.
Notice of Reason for Refusal from Japanese Patent Appl. No. 2015-513326, dated Mar. 28, 2017.
TW Office Action, Application No. 102121536, dated Nov. 1, 2016.
EPO Communication, Application No. 13735363.7, dated Aug. 29, 2017.

* cited by examiner

DATA TRANSFER BETWEEN CLOCK DOMAINS

This invention relates to systems and methods for transferring data signals between clock domains in digital systems, in particular where the clock domains are not synchronised.

In many different electronics systems, e.g. in a wireless (e.g. Bluetooth) system, there exist two or more clock domains which run at different frequencies but are required, at least sporadically, to communicate with each other. For example, a central processor may run at a high frequency with one or more peripherals running at a low frequency. In addition, one of the clock domains may enter periods of inactivity, e.g. a sleep or standby mode, when it is not being used in order to save power. In these periods there is no communication between the two clock domains, however when the one clock domain exits the sleep or standby mode, it will often need to communicate with the other clock domain. Furthermore, the fast and the slow clock domains will not generally be synchronised with each other.

It is known in systems which include different clock domains which are not synchronised to each other, and may be of different frequencies, to employ a "handshaking" procedure in which the clock domains negotiate parameters in order to establish that the slower clock domain is ready to receive a signal from the faster clock domain, e.g. by the use of busy flags. This is necessary so that a signal can be transferred from the faster clock domain during a safe period of the slower clock domain, i.e. away from a positive transition (in which the clock changes from zero (0) to one (1)) in the slower clock domain, in order to avoid corruption of the signal or meta-stability of the system. However the known handshaking procedures are relatively slow as they are clocked by, and require multiple cycles of, the slower clock domain to achieve synchronisation between the clock domains. As well as being slow, this consumes a significant amount of power, since the faster clock domain must be kept running during the procedure.

Furthermore, particularly when transferring data from a faster clock domain to a slower clock domain using conventional handshaking procedures, it must be ensured that the source data in the faster clock domain does not change throughout the procedure until the data has been transferred or there is a risk that some bits will transfer and so represent the newer data whereas some will not and so represent the older data which gives rise to corrupted data. Thus conventionally a 'freeze' would be put on the source data which is inconvenient particularly in light of the delays in transferring explained above which result from the need for multiple synchronisation signals to be sent back and forth between the two clock domains to check that everything is safe to transfer the data.

It is an aim of the present invention to provide improved systems and methods for communication between two clock domains of different frequencies.

When viewed from a first aspect the invention provides a system for transferring a data signal from a first clock domain to a second clock domain, wherein the first clock domain comprises a first clock and the second clock domain comprises a second clock, the system comprising:
  a signal input for receiving an input signal from the first clock domain;
  means for checking whether the slower of the first or second clock is in a part of its cycle away from a forthcoming transition, said checking means being clocked by the faster of the first or second clock; and
  means for transferring the input signal to the second clock domain if the checking means determines that the slower clock is in part of its cycle away from a forthcoming transition.

The invention also provides a method of transferring a data signal from a first clock domain to a second clock domain, wherein the first clock domain comprises a first clock and the second clock domain comprises a second clock, the method comprising:
  receiving an input signal from the first clock domain;
  checking whether the slower of the first or second clock is in a part of its cycle away from a forthcoming transition using checking means clocked by the faster of the first or second clock; and
  transferring the input signal to the second clock domain if the check determines that slower clock is in a part of its cycle away from a forthcoming transition.

Although the invention could be used for transferring a data signal from a first slower clock domain to a second faster clock domain, the present invention is particularly beneficial for transferring a data signal from a first faster clock domain to a second slower clock domain.

Therefore, when viewed from a further aspect the invention provides a system for transferring a data signal from a first clock domain to a second clock domain, wherein the first clock domain comprises a first clock having a frequency greater than a frequency of a second clock in the second clock domain, the system comprising:
  a signal input for receiving an input signal from the first clock domain;
  means for checking whether the second clock is in a part of its cycle away from a forthcoming transition, said checking means being clocked by the first clock; and
  means for transferring the input signal to the second clock domain if the checking means determines that the second clock is in part of its cycle away from a forthcoming transition.

The invention also provides a method of transferring a data signal from a first clock domain to a second clock domain, wherein the first clock domain comprises a first clock having a frequency greater than a frequency of a second clock in the second clock domain, the method comprising:
  receiving an input signal from the first clock domain;
  checking whether the second clock domain is in a part of its cycle away from a forthcoming transition using checking means clocked by the first clock; and
  transferring the input signal to the second clock domain if the check determines that second clock is in a part of its cycle away from a forthcoming transition.

The checking means could be arranged to detect a positive and/or a negative transition, i.e. the data values in the second clock domain could change on one or both of the positive and negative transitions of the second clock. However, in a set of embodiments the transition being detected is a positive transition.

Thus it will be appreciated that instead of using handshaking and/or busy flags, in accordance with the invention a check is carried out as to which part of its cycle the slow clock domain in is and as long as it is in a 'safe' part of the cycle, i.e. there is no transition imminent, the signal from the fast clock domain can simply be transferred to the slow clock domain or the signal from the slow clock domain can simply be read by the fast clock domain. The Applicant has appreciated that this results in a faster transfer of the signal from the first clock domain to the second clock domain because the check of the slow clock is clocked by the fast clock. For example, in known arrangements involving handshaking, the synchronisation and transfer time is typically at least two slow clock cycles, compared to the synchronisation and transfer time for embodiments of the present invention which can be as little as two fast clock cycles. Although the invention is of benefit for transferring a data signal from a first, slower clock domain to a second, faster clock domain, reference will henceforth be made primarily to a set of embodiments in which the first clock has a greater frequency than the second clock.

The check of the second clock is made to ensure that its cycle is away from a forthcoming positive transition from zero to one, so that the transfer of the input signal from the first clock domain to the second clock domain does not coincide with a transition in the second clock cycle. This is because data values in the second clock domain are read on the positive edge, so transferring a value into the second clock domain at this time could lead to data corruption or meta-stability.

The Applicant has appreciated that since the transfer takes place in a safe part of the second, slow clock cycle, it is not necessary to synchronise the data signal being transferred Thus in a set of preferred embodiments the input signal is not transferred from the first clock domain to the second clock domain via the checking means. In a particular set of embodiments there is no component introducing a clock cycle time delay between the input in the first clock domain and output in the second clock domain.

Although this is of benefit for single bit signals, particularly when there is a large difference in the frequencies of the first and second clock domains, it is of significant benefit for multi-bit buses—since the whole signal can be transferred on the basis of the check made on the second clock without performing a check on every bit which would require a significant number of gates and thus a significantly greater area on an integrated circuit and greater power consumption. It also means that embodiments of the invention do not need to introduce the latency associated with serial flip flops or other arrangements typically used to used to match clock domains in the prior art.

In some embodiments of the invention the input signal comprises at least 8, 16 or 32 bits e.g. from a bus though it will be appreciated that the bus could comprise any number of multiple bits. When reference is made herein to data being transferred, this encompasses both single bit signals and multi-bit buses.

A further benefit in reducing power consumption may be achievable with a quicker transfer as it allows one or both of the clocks to go into or return to a sleep state more quickly if appropriate. This would typically be the faster and more power consuming first clock domain which, for example, periodically reads data from the second clock domain that may act as a low power timer.

The check of the second clock could comprise any suitable way of determining that it is not going to have a transition (zero to one or one to zero) in its clock cycle before the input signal has been transferred from the first clock domain to the second clock domain. In one set of embodiments the check of the second clock comprises determining if the second clock is in a positive part of its cycle. If this is the case there is at least half a slow clock cycle in which to perform the necessary check and transfer the input signal. In this set of embodiments the first clock needs to have a frequency (by which the checking means is clocked) which is greater than the frequency of the second clock by a multiple of at least twice the number of steps in the check, in order to have enough time to be able to perform all the steps of the check and transfer the input signal from the first clock domain to the second clock domain within the safe part of the second clock domain.

Although the frequency of the first clock could be an integer multiple of the frequency of the second clock and/or have a fixed phase, in general no synchronisation or particular relationship is required in accordance with the present invention. Furthermore, embodiments of the invention are tolerant to the second clock domain entering a sleep or standby mode and restarting asynchronously.

In one set of embodiments the frequency of the first clock at least four times the frequency, e.g. at least ten times the frequency, e.g. at least one hundred times the frequency, e.g. at least one thousand times the frequency of the second clock. This ensures that there is sufficient time for the check of the second clock to be performed and for the signal to be transferred from the first clock domain to the second clock domain without risk of there being a transition in the second clock during the transfer and the associated risk of data corruption or meta-stability. It also reflects the different clock domains present in commercial products. In an exemplary set of embodiments the frequency of the first clock is 16 MHz and the frequency of the second clock is 32 kHz.

The check of the second clock could be performed at any point during the cycle of the first clock and this need not be fixed. In one set of embodiments the check is performed at a rising edge of the first clock. The check may comprise multiple steps, with subsequent steps being performed at a subsequent, e.g. the next, rising edge of the first clock. As mentioned previously, it will be seen that the first clock needs to have a frequency which is greater than the frequency of the second clock by a multiple of a least the number of steps in the check, in order to have enough time to be able to perform all the steps of the check and transfer the input signal from the first clock domain to the second clock domain within a safe part of the second clock cycle.

In one set of embodiments the second clock may enter an inactive period, e.g. in a sleep or standby mode. However, even though the second clock is inactive, i.e. its clock cycle is not running, it still may be desired to transfer a signal from the first clock domain to the second clock domain. In this situation, a check of which part of the cycle the second clock is in is not possible, and therefore the system may comprise means to determine if the second clock is active. If this check is satisfactory, i.e. the second clock is found to be inactive, then the input signal can be transferred from the first clock domain to the second clock domain. In this situation, the input signal will be transferred safely because it can be guaranteed, owing to the inactive second clock, that there will not be a transition in the second clock during the transfer.

The checking means could comprise any suitable arrangement depending on the nature of the check. In one set of embodiments the means for performing the check comprises a flip-flop, e.g. a D-type flip-flop, though any type of clocked flip-flop may be used. This is suitable for example when the check comprises determining whether the second clock is high. Preferably the means for performing the check comprises two flip-flops in series. Providing more than one flip-flop acts to increase the certainty of the check performed by the flip-flop. There is a small chance that the output from the flip-flip will be in an unstable state that takes some time to resolve itself—e.g. if the check is made just as the second clock is going through a transition. However, if this output is then fed into the input of a further flip-flop, the chance of an unstable state being passed through both the flip-flops is very small, i.e. because the probabilities are multiplicative.

The flip-flops are each clocked by the first clock. Thus it will be appreciated that in a preferred set of embodiments the flip-flops are each triggered by rising edges of the first clock, with the flip-flop performing the second check being triggered by the subsequent rising edge following the rising edge that triggers the flip-flop performing the first check. More than two flip-flops in series could be used. Adding extra flip-flops acts to increase further the accuracy of the check of the second clock, and so at very high frequencies, when the risk of meta-stability is greater, it may be necessary to have more than two flip-flops.

In one set of embodiments the system comprises means for detecting if there is a new input signal from the first clock domain, e.g. if it has changed from a previously transferred value. This allows the system to know when it needs to perform the synchronisation between the first and second clock domains, and also allows the second clock to go into a sleep mode during the period after the signal has been transferred and before a new signal is detected, thus saving power. Preferably the detecting means comprises a comparator—e.g. an Exclusive-OR (XOR) gate—between the input signal from the first clock domain and the output signal to the second clock domain. When these two signals are not equal, because the input signal has changed and this has not yet been propagated to the output signal, the comparator generates a signal to the system that the input signal has changed.

In one set of embodiments, the check of the second clock could be performed continuously, e.g. every cycle of the first clock. However, in another set of embodiments the system comprises means for initiating the check of the second clock. This could be a specific signal which is sent in order for the check to be performed, or it could be linked to other signals or cycles in the system. For example, the check could be initiated by a change in the input signal, as discussed above, or by the system entering or exiting a standby or sleep mode. Embodiments in which the check is initiated rather than being performed continuously are advantageous as they help the system to reduce the power consumption as the checks are only performed when necessary.

In one set of embodiments the system is such that the input signal can be changed at any time during synchronisation without affecting the synchronisation process or the resultant transfer of the input signal from the first clock domain to the second clock domain, e.g. by causing meta-stability in the output signal. This can be achieved if the check of the second clock is performed independently of the state of the input signal, e.g. as described above in the set of embodiments in which the check takes as an input the second clock, but also owing to the fact that the input signal bypasses the means for performing the check. In this set of embodiments the checking means is clocked by the first clock and its input is the second clock domain, so it is simply generating a "safe" synchronisation signal in order that the system can know it is safe to transfer the input signal. It therefore does not matter as to the state of the input signal, which can change during this synchronisation period. This is in contrast to the conventional handshaking procedure in which a freeze is put on the data signal being transferred from the first clock domain, e.g. through the use of busy flags, in order to perform the synchronisation between the first and second clock domains. This clearly adds to the time and therefore power consumed by the system. It will be appreciated that embodiments of the present invention remove these restrictions resulting in a faster transfer of the data signal which consumes less power.

In one set of embodiments the system comprises means for storing the input signal, e.g. a storage device or component, with the method comprising the step of storing the input signal. This allows the input signal to be stored in the system while the check of the second clock is being performed, and from which the signal can be output. However, the feature discussed above of performing the check of the second clock independently of the input signal means that it may not be necessary to provide such a storing means. In one set of embodiments a direct connection may be provided between the signal input from the first clock domain and the output to the second clock domain. Thus once the check of the second clock has been made, the system can be "opened up" to simply transfer the input signal from the first clock domain to the second clock domain.

The means for storing the signal input from the first clock domain could comprise any suitable data storage component, arrangement or device which is able to store the signal during unsafe parts of the second clock cycle and/or during the synchronisation process so that the signal is ready to be output to the second clock domain when it enters a safe part of its cycle. This could comprise a register/flip-flop. Such a component may store the input signal until it receives a signal, e.g. from the synchronisation process, that it is safe to transfer it to the second clock domain. The storing means could receive the input signal from the signal input, i.e. the storing means and the signal input could comprise separate components: one to receive the input signal and one to store the input signal. However this function could also be performed by a single component which receives and stores the signal input from the first clock domain.

The output to the second clock domain could simply comprise an output line or wire. Alternatively or in addition the output could comprise a component which receives a signal from the means for performing the check that the second clock is in a part of its cycle away from a forthcoming transition, and then outputs the signal to the second clock domain. This could be a separate component or it could be the same component as some of the other means in the system, e.g. the means for receiving and/or storing the input signal could also output the signal once it has received the signal that it is safe to transfer it to the second clock domain. Preferably the output is clocked by the first clock. This enables the input signal from the first clock domain to be output quickly to the second clock domain once a satisfactory check of the second clock has been performed.

Each of the components in the system, e.g. the receiving means, the means for performing the check of the second clock domain, the outputting means, could comprise logic components, as has been discussed previously. In one set of embodiments the logic for these components is synthesised using a design compiler. Preferably the system is provided as part of an integrated circuit on a silicon chip or equivalent.

Certain embodiments of the invention will now be described, by way of example only, with reference to the accompanying drawings, in which.

Figure 1:
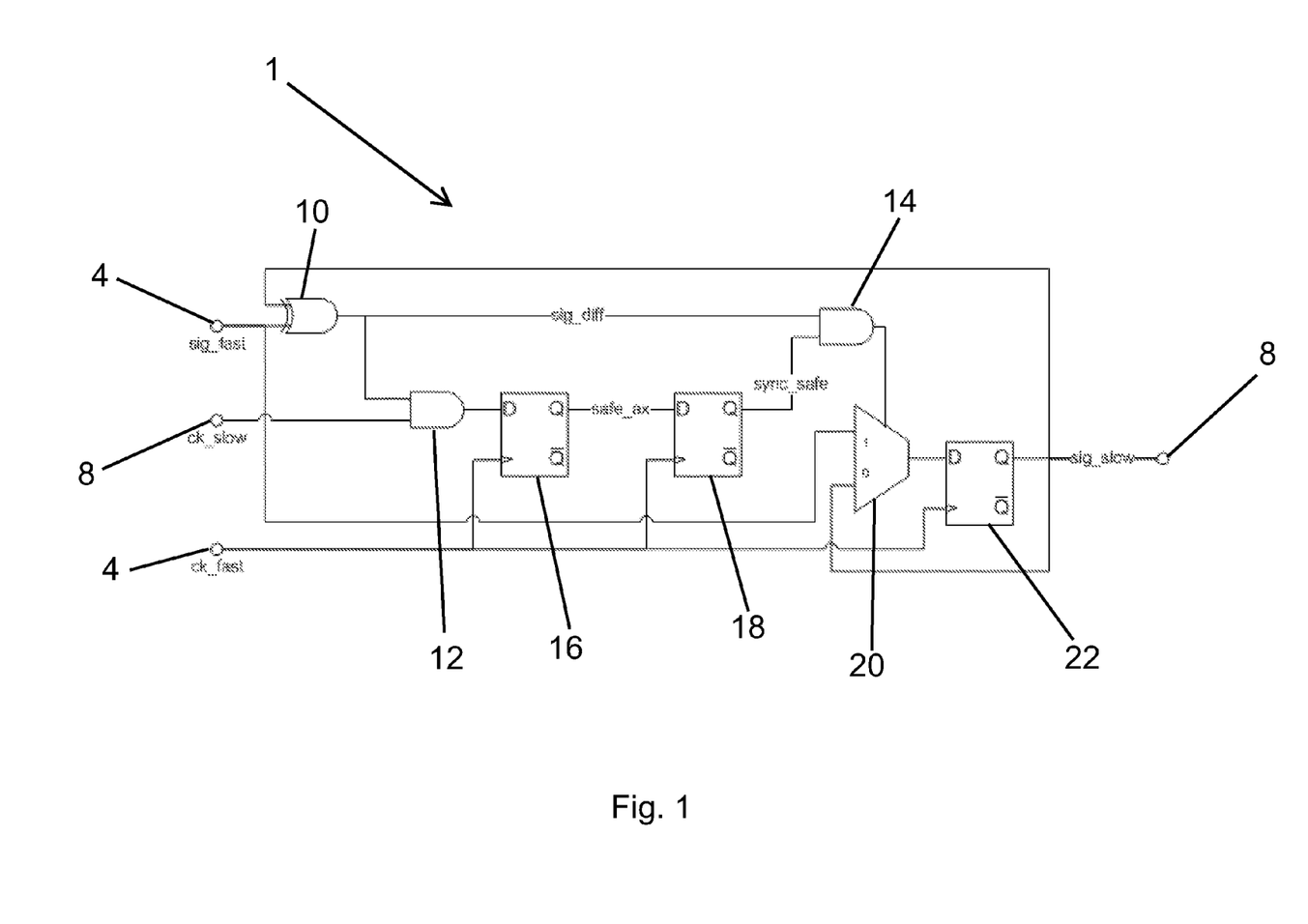
FIG. 1 shows a diagram of an embodiment of a logic circuit in accordance with the invention.

FIG. 1 shows a schematic logic circuit diagram corresponding to an embodiment in accordance with the invention. The circuit 1 is arranged to transfer an input signal, sig_fast, from a first clock domain 4 as an output signal, sig_slow, to a second clock domain 8. The frequency of the first clock is greater than the frequency of the second clock, with typical frequencies being 50 MHz for the first clock and 32 kHz for the second clock.

The circuit 1 comprises an XOR gate 10 acting as a comparator which takes as its input the input signal, sig_fast, and the output signal, sig_slow. The output from the XOR gate 10 is fed to two AND gates 12, 14. The first AND gate 12 also takes as its input the clock, ck_slow, from the second, lower frequency, clock domain 8. The second AND gate 14 takes as its input the output, sig_diff, from the XOR gate 10 and the output, sync_safe, from two D-type flip-flops 16, 18 which are arranged in series.

The first flip-flop 16 has as its D input the output from the first AND gate 12 and is clocked by the clock, ck_fast, from the first, higher frequency, clock domain 4. The Q output, safe_ax, from the first flip-flop 16 is fed to the D input of the second flip-flop 18, which again is clocked by the fast clock, ck_fast. As mentioned above, the Q output, sync_safe, from the second flip-flop is fed to the input of the second AND gate 14.

The output from the second AND gate 14 is fed to the selector input of a multiplexer 20. The inputs to the multiplexer 20 are the input signal, sig_fast, and the output signal, sig_slow, from the final flip-flop 22. The output from the multiplexer 20 is fed to a further D-type flip-flop 22, again which is clocked by the fast clock, ck_fast. The Q output from the final flip-flop 22 is the output, sig_slow, to the second clock domain 8.

Figure 2:
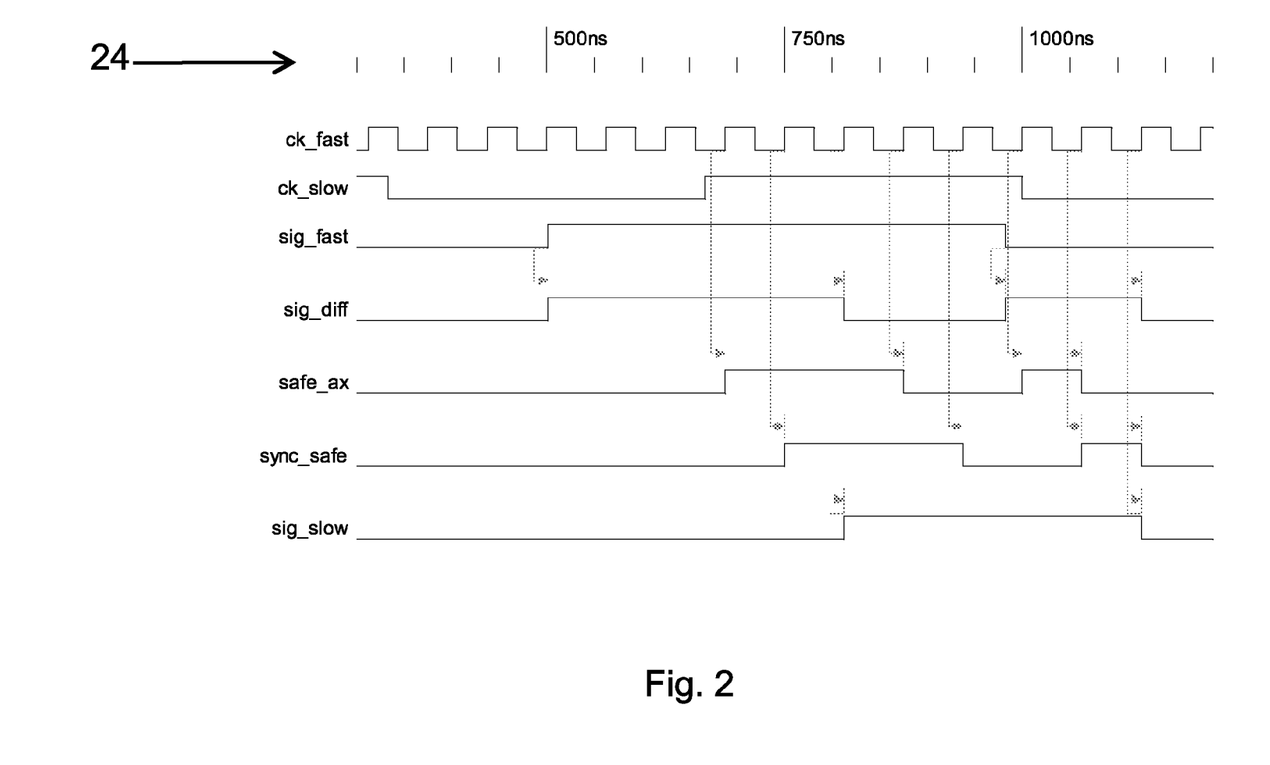
FIG. 2 shows the timing diagram associated with the circuit diagram shown in FIG. 1.

Operation of the system will now be described with reference to FIG. 1 as well as FIG. 2 which shows the sequence of one-bit logic signals passing through the system. A representative time scale 24 is given in subdivisions of 50 ns. As shown in FIG. 2 and for the purposes of illustration, the frequency of the clock, ck_fast, from the first, higher frequency, clock domain 4, is taken to be 16 MHz and the frequency of the clock, ck_slow, from the second, lower frequency, clock domain 8, is taken to be 1.5 MHz. In practice these are likely to be more disparate, as has been detailed previously, but here these more comparable values have been chosen for the convenience of illustration.

Initially the system is in a state in which both the input signal, sig_fast, from the first clock domain 4 and the output signal, sig_slow, to the second clock domain 8 are both zero. This results in an output, sig_diff, from the XOR gate 10 of zero, and therefore the output from the second AND gate 14 is zero, causing the multiplexer 20 to output the zero input, i.e. sig_slow, to the final flip-flop 22. Thus the output, sig_slow, to the second clock domain 8 remains zero.

At 500 ns the input signal, sig_fast, changes from zero to one. This results in the output, sig_diff, from the XOR gate 10 changing to one at the same time. At 666.67 ns, the slow clock, ck_slow, changes from zero to one. Shortly after this point is the portion of its cycle when it is safe to transfer signals since it will be at least half the slow clock cycle before there is an unwanted positive (zero to one) transition. This results in the output from the first AND gate 12 changing from zero to one, which is then fed to the D input to the first flip-flop 16. At 587.5 ns when the fast clock, ck_fast, changes from zero to one, i.e. the first rising edge of ck_fast following the rising edge of ck_slow, the first flip-flop 16 is triggered into clocking its D input to its Q output, safe_ax. This signal, safe_ax, is fed to the D input of the second flip-flop 18 until the next rising edge of the fast clock, ck_fast, at 750 ns upon which it is transferred to its Q output, sync_safe.

Now that both the signals sync_safe and sig_diff are one, the output from the second AND gate 14 becomes one and thus the output from the multiplexer 20 changes from the zero input to the one input, i.e. the output from the multiplexer 20 is now the one from the signal sig_fast. This is fed to the D input of the final flip-flop 22 such that on the next rising edge of the fast clock, ck_fast at 812.5 ns, this signal clocked out on the Q output of the final flip-flop 22 and thus output as sig_slow to the second clock domain 8.

Once the output, sig_slow, to the second clock domain 8 has changed to one, this is fed back to the XOR gate 10 which causes its output, sig_diff, to change to zero, indicating that the change in sig_fast has been propagated through to sig_slow. whilst the input signal, sig_fast, from the first clock domain 4 has remained at one. This causes a zero signal to be output from the second AND gate 14 resulting in the zero input of the multiplexer 20 to be output to the final flip-flop 22. However, this is simply the output, sig_slow, to the second clock domain 8, so this remains the same until a change in the input signal, sig_fast, is detected, and the synchronisation checks, i.e. the first two flip-flops 16, 18, confirm that the second clock is in a safe period of its cycle to transfer the input signal.

The change of sig_diff to zero also causes a zero signal to be passed through the first AND gate 12, and the first and second flip-flops 16, 18, resulting in an output of sync_safe of zero. This causes a zero signal to be output from the second AND gate 14 resulting in the zero input of the multiplexer 20 to continue be output to the final flip-flop 22, i.e. the value output from the multiplexer 20 does not change. This is the input signal, sig_fast, from the first clock domain 4, which also has not changed, so the output, sig_slow, to the second clock domain 8 which remains at one.

Thus it can be seen that the time for a new signal to be transferred from the first clock domain 4 through to the second clock domain 8 is less than half a cycle of the second clock domain 8 plus two cycles of the first clock domain 4, i.e. a maximum transfer time of 458.33 ns with the frequencies of the clock domains shown in FIG. 2. However, with the particular sequence of signals as described and shown in FIG. 2, the transfer time is actually much less, at 312.5 ns.

At 975 ns the input, sig_fast, from the first clock domain 4 changes from one to zero, thus causing the output, sig_diff, from the XOR gate 10 to change from zero to one, i.e. because the input signal, sig_fast, is now different to the output signal, sig_slow. Because the second clock domain 8 is still in the positive part of its cycle, i.e. its value is one, this propagates a further one signal through the first two flip-flops 16, 18, creating a sync_safe signal of one which causes the new input signal, sig_fast, to be transferred through the final flip-flop 22 to the output, sig_slow, of the second clock domain 8. However, it can be seen that shortly after the input, sig_fast, changes from one to zero, the second clock domain 8 changes from one to zero. However, because this happened at a positive edge of the first clock domain 4, the value of the second clock domain 8 sampled was one, and it is this value which is propagated through the first two flip-flops 16, 18. The input signal, sig_fast, can still be transferred safely from the first clock domain 4 to the second clock domain 8 because there is still half the period of the second clock before the unwanted positive transition, which is enough time to perform the necessary synchronisation checks and transfer the input signal, sig_fast. In this example, the transfer of the data occurs within only 150 ns following the change in the input signal, sig_fast. However the data signal, sig_slow, now in the second clock domain 8 will not be used by this clock domain to update various other values until the next positive transition in the second clock domain 8, i.e. at 1333.33 ns.

Figure 3:
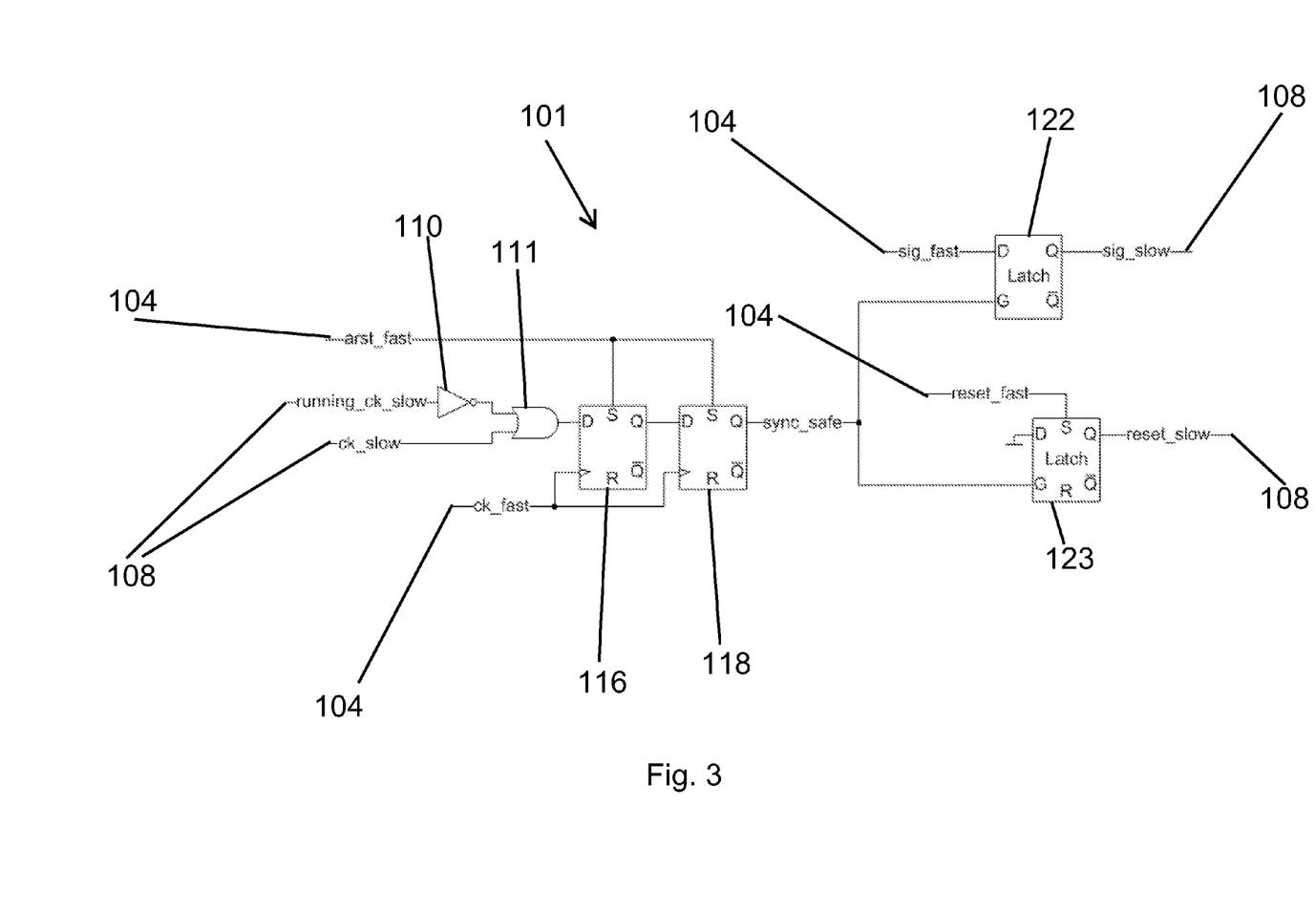
FIG. 3 shows diagram of an embodiment of a different logic circuit in accordance with the invention.

The schematic logic circuit diagram 101 in FIG. 3 shows a second embodiment in accordance with the invention. As with the circuit diagram shown in FIG. 1 at the heart of the system lie two flip-flops 116, 118 which are arranged in series such that the Q output of the first flip-flop 116 is transferred to the D input of the second flip-flop 118. Again, these two flip-flops 116, 118 act to ensure that the second clock domain 108 is in a part of its cycle away from a positive edge, so that the input signal, sig_fast, can be transferred safely from the first clock domain 104. As with the system of FIGS. 1 and 2, the frequency of the clock signal, ck_fast, from the first clock domain, is much greater than the frequency of the clock signal, ck_slow, from the second clock domain.

The first two flip-flops 116, 118 are clocked using the clock, ck_fast, from the first clock domain 104 such that the synchronisation of the first and second clock domains 104, 108 can be performed very quickly. The D input to the first flip-flop 116 is the output of an OR gate 111, which has as its inputs the clock, ck_slow, from the second clock domain 104, and a flag, running ck_slow, which indicates whether the second clock domain 104 is active or not, this first being passed through a NOT gate 110. A further asynchronous reset signal, arst_fast, from the fast domain 104, is fed into the S (Set) input of the flip-flops 116, 118 to override the clocking by the fast clock, ck_fast, from the first clock domain 104 to transfer the D input to the Q output of the flip-flops 116, 118.

The Q output, sync_safe, of the second flip-flop 118 is fed to the enable input of a latch 122 which has as its D input the input signal, sig_fast, from the first clock domain 104. The Q output of this latch 122 is the output, sig_slow, to the second clock domain 108. This latch 122 is used for normal transfers of data signals from the first clock domain 104 to the second clock domain 108, once they have been synchronised by the circuit 101. A further latch 123 also has as its enable input the Q output, sync_safe, of the second flip-flop 118. This latch 123 has an grounded signal to its D input and an input, reset_fast, to the S input of the latch 123. The Q output, reset_slow, allows a reset signal to be transferred from the first clock domain 104 to the second clock domain 108. In FIG. 3, the latch 123 is shown in arrangement which is active high, i.e. a one signal is output from the Q output to reset_slow, when the reset_fast signal is applied to the S input of the latch 123. Alternatively the latch 123 could be operated in an active low mode with the reset_fast input connected to the R (Reset) input of the latch 123.

Operation of the circuit shown in FIG. 3 will now be described. If the second clock domain 108 is not active, the signal, running ck_slow will be zero. As the second clock, ck_slow, is not running, there is no possibility of a positive transition in its signal which could give meta-stability, so as long as the second clock, ck_slow, is not running, it is always safe to transfer data to the second clock domain 108. This zero value of running ck_slow is changed by the NOT gate 110 to a one signal which thus causes a one signal to be output from the OR gate 111. Therefore a one signal is sent to the D input of the first flip-flop 116, which upon the subsequent rising edges of the clock cycle signal, ck_fast, of the first clock domain 104, is transferred through to the Q output of the second flip-flop 118.

If the first clock domain 104 is in a reset phase, a signal, arst_fast, can be used override the D input to the flip-flops 116, 118. This enables a known output to be delivered to the latches 122, 123 during this reset period, thus giving a known value which can be output as sig_slow to the second clock domain 108. Such that this does not interfere with the synchronisation of the output signal, sig_slow in the second clock domain 108, the second clock, ck_slow, is not allowed to be started until after the reset period of the first clock domain 104 and the outputs of the two flip-flops 116, 118 have settled back to zero, following which normal operation of the circuit 101 can commence.

If the second clock domain 108 is active, the signal, running ck_slow will be one, indicating that the second clock, ck_slow, is running and thus it needs to be monitored for positive transitions in order to determine when it is safe to transfer data signals from the first clock domain 104 to the second clock domain 108. This one value of running ck_slow is changed to zero by the NOT gate 111 and therefore the slow clock, ck_slow, is needed to be one for the OR gate 110 to provide a one output, i.e. the second clock, ck_slow, needs to be in a positive part of its signal to ensure that it is far enough away from a forthcoming positive transition in order to allow the synchronisation of the first and second clock domains 104, 108 to take place so that the input signal, sig_fast, from the first clock domain 104 can be transferred safely. Therefore once the slow clock, ck_slow, changes to one, this can be passed through the flip-flops 116, 118.

The result, either if the second clock domain is active or not, is a safe one signal being passed to the enable input of the latch 122 which causes the input signal, sig_fast, to be transferred straight through from the first clock domain 104 to be output as sig_slow to the second clock domain 108. The safe one signal from the synchronisation process also causes a low zero signal to be transferred through the further latched flip-flop 123 to cancel the reset signal, reset_slow, when the second clock domain 108 is in a safe period of its clock cycle. This will remain unless a reset signal, reset_fast, is received from the first clock domain 104 to the S input of the flip-flop 123.

Figure 4:
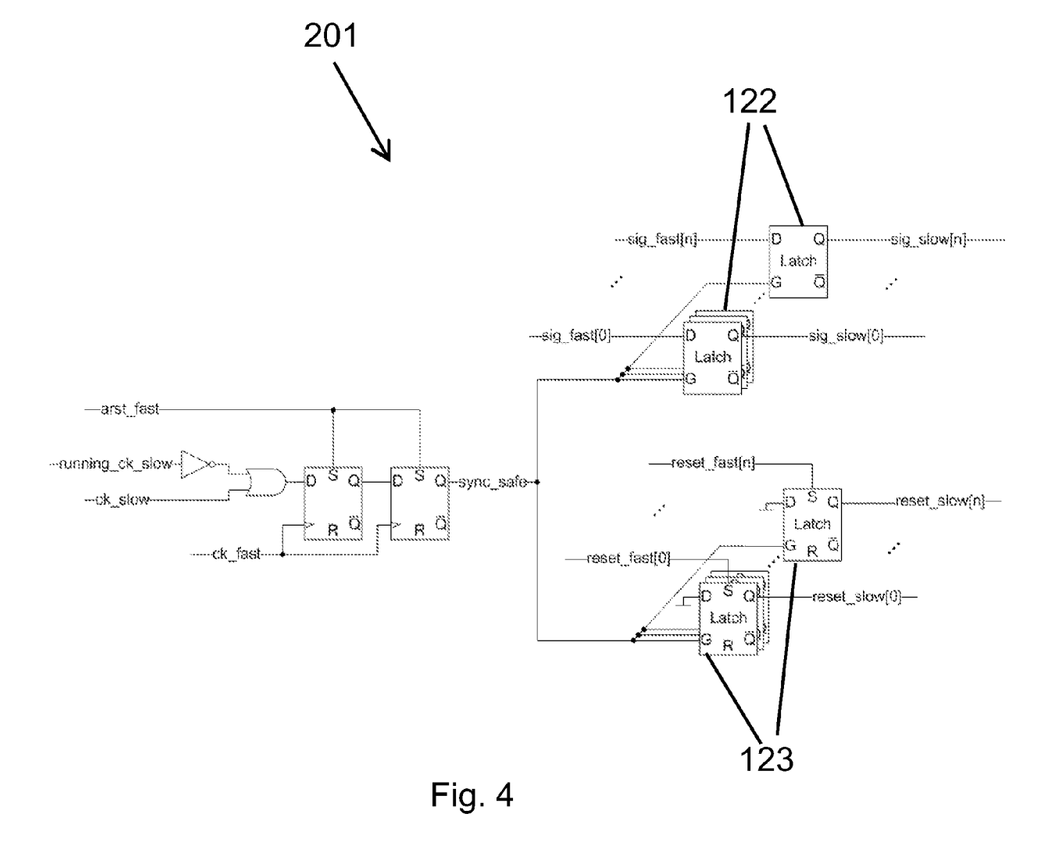
FIG. 4 shows an embodiment similar to that shown in FIG. 3, but used for buses.

FIG. 4 shows a circuit 201 almost identical to FIG. 3, which operates in a very similar way. The only difference is that the output latches 122, 123 in FIG. 3 have been replaced by multiple output latches 222, 223 in parallel. Thus it will be appreciated that the circuit 201 can be easily adapted to use with buses. The operation is the same as for FIG. 3, except that when the data signal, sig_fast, or the reset signal, reset_fast, is to be transferred from the bus in the first clock domain to the bus in the second clock domain, this is done in parallel using the respective output latches 222, 223, all of which are controlled by the same one signal, sync_safe.

It will be appreciated by those skilled in the art that many variations and modifications to the embodiments described above may be made within the scope of the various aspects of the invention set out herein. For example it is not necessary to provide a final flip-flop to output the transferred signal to the second clock domain, this could be performed by any other data storage component, or even just by opening up the circuit to enable the input signal to be transferred straight from the input from the first clock domain to be output to the second clock domain.

The invention claimed is:

1. A system for transferring a data signal from a first clock domain to a second clock domain, wherein the first clock domain comprises a first clock having a frequency greater than a frequency of a second clock in the second clock domain, the system comprising:

a signal input for receiving an input signal from the first clock domain;

a checking circuit portion for receiving an input from the second clock to determine whether said second clock is in a part of its cycle away from a forthcoming transition, said checking circuit portion being clocked by the first clock; and a transferring circuit portion for transferring the input signal to the second clock domain at a non-predetermined time if the checking circuit portion determines that the second clock is in part of its cycle away from a forthcoming transition.

2. A system as claimed in claim 1, wherein the forthcoming transition is a forthcoming positive transition.

3. A system as claimed in claim 1, wherein the input signal is not transferred from the first clock domain to the second clock domain via the checking means.

4. A system as claimed in claim 1, wherein the input signal comprises at least 8, 16 or 32 bits.

5. A system as claimed in claim 1, wherein the check of the second clock comprises determining if the second clock is in a positive part of its cycle.

6. A system as claimed in claim 1, wherein the frequency of the first clock at least four times the frequency of the second clock.

7. A system as claimed in claim 1, wherein the check is performed at a rising edge of the first clock.

8. A system as claimed in claim 1, comprising a determining circuit portion to determine if the second clock is active.

9. A system as claimed in claim 1, wherein the checking circuit portion comprises a flip-flop.

10. A system as claimed in claim 1, wherein the checking circuit portion comprises two flip-flops in series.

11. A system as claimed in claim 1, comprising a detecting circuit portion for detecting if there is a new input signal from the first clock domain.

12. A system as claimed in claim 11, wherein the detecting circuit portion comprises a comparator between the input signal from the first clock domain and the output signal to the second clock domain.

13. A system as claimed in claim 1, comprising an initiating circuit portion for initiating the check of the second clock.

14. A system as claimed in claim 1, comprising a storing circuit portion for storing the input signal.

15. A system for transferring a data signal from a first clock domain to a second clock domain, wherein the first clock domain comprises a first clock and the second clock domain comprises a second clock, the system comprising:

a signal input for receiving an input signal from the first clock domain;

a checking circuit portion for receiving an input from the slower of the first or second clock to determine whether the slower of the first or second clock is in a part of its cycle away from a forthcoming transition, said checking circuit portion being clocked by the faster of the first or second clock; and a transferring circuit portion for transferring the input signal to the second clock domain at a non-predetermined time if the checking means determines that the slower clock is in part of its cycle away from a forthcoming transition.

16. A method of transferring a data signal from a first clock domain to a second clock domain, wherein the first clock domain comprises a first clock having a frequency greater than a frequency of a second clock in the second clock domain, the method comprising:

receiving an input signal from the first clock domain;

receiving an input from the second clock domain and determining whether said second clock is in a part of its cycle away from a forthcoming transition using checking means clocked by the first clock; and transferring the input signal to the second clock domain at a non-predetermined time if the check determines that second clock is in a part of its cycle away from a forthcoming transition.

17. A method as claimed in claim 16, wherein the forthcoming transition is a forthcoming positive transition.

18. A method as claimed in claim 16, wherein the input signal is not transferred from the first clock domain to the second clock domain via the checking means.

19. A method as claimed in claim 16, wherein the input signal comprises at least 8, 16 or 32 bits.

20. A method as claimed in claim 16, wherein the checking of the second clock comprises determining if the second clock is in a positive part of its cycle.

21. A method as claimed in claim 16, wherein the frequency of the first clock at least four times the frequency of the second clock.

22. A method as claimed in claim 16, wherein the checking is performed at a rising edge of the first clock.

23. A method as claimed in claim 16, comprising determining if the second clock is active.

24. A method as claimed in claim 16, comprising using a flip-flop to carry out said checking.

25. A method as claimed in claim 16, comprising using two flip-flops in series to carry out said checking.

26. A method as claimed in claim 16, comprising detecting if there is a new input signal from the first clock domain.

27. A method as claimed in claim 26, wherein the step of detecting comprises using a comparator between the input signal from the first clock domain and the output signal to the second clock domain.

28. A method as claimed in claim 16, comprising initiating the check of the second clock.

29. A method as claimed in claim 16, comprising storing the input signal.

30. A method of transferring a data signal from a first clock domain to a second clock domain, wherein the first clock domain comprises a first clock and the second clock domain comprises a second clock, the method comprising:

receiving an input signal from the first clock domain;

receiving an input from the slower of the first or second clock and determining whether the slower of the first or second clock is in a part of its cycle away from a forthcoming transition using checking means clocked by the faster of the first or second clock; and transferring the input signal to the second clock domain at a non-predetermined time if the check determines that slower clock is in a part of its cycle away from a forthcoming transition.

* * * * *